(12) United States Patent
Xiao et al.

(10) Patent No.: US 12,129,389 B2
(45) Date of Patent: Oct. 29, 2024

(54) FAST DRY INK COMPOSITION FOR CONTINUOUS INKJET APPLICATIONS

(71) Applicant: VIDEOJET TECHNOLOGIES INC., Wood Dale, IL (US)

(72) Inventors: Fengfei Xiao, Glenview, IL (US); Godwin Deng, Schaumburg, IL (US); Linfang Zhu, Woodridge, IL (US)

( * ) Notice: Subject to any disclaimer, the term of this patent is extended or adjusted under 35 U.S.C. 154(b) by 0 days.

(21) Appl. No.: 16/604,845

(22) PCT Filed: Apr. 12, 2018

(86) PCT No.: PCT/US2018/027253
§ 371 (c)(1),
(2) Date: Oct. 11, 2019

(87) PCT Pub. No.: WO2018/191468
PCT Pub. Date: Oct. 18, 2018

(65) Prior Publication Data
US 2020/0079967 A1    Mar. 12, 2020

Related U.S. Application Data

(60) Provisional application No. 62/485,421, filed on Apr. 14, 2017.

(51) Int. Cl.
| | | |
|---|---|---|
| C09D 11/36 | (2014.01) | |
| B41J 2/02 | (2006.01) | |
| B41J 2/21 | (2006.01) | |
| B41M 5/00 | (2006.01) | |
| C09D 11/033 | (2014.01) | |
| C09D 11/037 | (2014.01) | |
| C09D 11/08 | (2006.01) | |
| C09D 11/104 | (2014.01) | |
| C09D 11/108 | (2014.01) | |
| C09D 11/14 | (2006.01) | |
| C09D 11/322 | (2014.01) | |

(52) U.S. Cl.
CPC ............. *B41J 2/02* (2013.01); *B41J 2/2107* (2013.01); *B41M 5/0023* (2013.01); *C09D 11/033* (2013.01); *C09D 11/037* (2013.01); *C09D 11/08* (2013.01); *C09D 11/104* (2013.01); *C09D 11/108* (2013.01); *C09D 11/14* (2013.01); *C09D 11/322* (2013.01); *C09D 11/36* (2013.01)

(58) Field of Classification Search
None
See application file for complete search history.

(56) References Cited

U.S. PATENT DOCUMENTS

| | | |
|---|---|---|
| 4,590,265 A | 5/1986 | Bogan et al. |
| 6,726,756 B1 | 4/2004 | Zou et al. |
| 8,142,559 B2 | 3/2012 | Robertson et al. |
| 8,414,695 B2 | 4/2013 | Robertson et al. |
| 8,530,534 B2 | 9/2013 | Burdeniuc et al. |
| 8,632,630 B2 | 1/2014 | Robertson et al. |
| 9,039,824 B2 | 5/2015 | Robertson et al. |
| 9,249,326 B2 | 2/2016 | Robertson et al. |
| 2004/0154495 A1* | 8/2004 | Zhu ............... C09D 11/36 106/31.41 |
| 2005/0252411 A1* | 11/2005 | Fraser ............ C09B 26/04 106/31.49 |
| 2007/0103529 A1 | 5/2007 | Pearl et al. |
| 2008/0066239 A1* | 3/2008 | Zhu ............... C09D 11/36 106/31.27 |
| 2009/0021568 A1* | 1/2009 | Xu ................. C09B 69/10 347/96 |
| 2010/0010144 A1* | 1/2010 | Duncan .......... C08G 79/00 524/500 |
| 2010/0028632 A1* | 2/2010 | Goustiaux ...... C09D 11/38 428/209 |
| 2010/0167023 A1* | 7/2010 | Oyanagi ......... C09D 11/36 428/195.1 |
| 2010/0178474 A1* | 7/2010 | Oyanagi ......... C09D 11/101 428/195.1 |
| 2010/0233368 A1* | 9/2010 | Zhu ............... C09D 11/328 427/256 |
| 2011/0012954 A1* | 1/2011 | Brown ........... C09D 11/107 524/556 |
| 2012/0026257 A1* | 2/2012 | Robertson ...... B41J 2/01 347/86 |
| 2012/0125229 A1* | 5/2012 | Gruner .......... C09D 11/322 106/31.86 |
| 2012/0308787 A1* | 12/2012 | Kozee ........... B41M 5/0023 347/20 |
| 2016/0177117 A1* | 6/2016 | Brown ........... C09D 11/38 524/556 |

FOREIGN PATENT DOCUMENTS

| | | |
|---|---|---|
| JP | 2010518214 A | 5/2010 |
| JP | 2010533747 A | 10/2010 |

(Continued)

OTHER PUBLICATIONS

PCT/US2018/027253 International Search Report and Written Opinion, dated Jun. 20, 2018, 7 pages.

(Continued)

*Primary Examiner* — Manish S Shah
(74) *Attorney, Agent, or Firm* — Wolter Van Dyke Davis, PLLC; Robert L. Wolter

(57) ABSTRACT

Embodiments of the invention relate to ink compositions suitable for applications in the printing industry, for example continuous inkjet printing, including ultra-high speed continuous inkjet printing. The ink compositions use volatile C5 ketone (pentanone) solvents (e.g., 2-pentanone, 3-pentanone, or 3-methyl-2-butanone) as a major solvent or the only solvent, and also include a binder resin and a colorant, but preferably contain substantially no acetone, methanol, or methyl ethyl ketone, or other solvents listed on the Japan ISHL class II organic solvents list. Preferred ink compositions can contain up to 30% ethanol, n-propanol, or other solvents not listed on the Japan ISHL class II organic solvents list, but preferably contain substantially no ethanol.

17 Claims, No Drawings

(56) References Cited

FOREIGN PATENT DOCUMENTS

| | | | | |
|---|---|---|---|---|
| JP | 7106573 B2 | 6/2020 | | |
| WO | 2008098899 A1 | 8/2008 | | |
| WO | WO-2010103088 A1 * | 9/2010 | ............ | C09D 11/38 |
| WO | 2017048499 A1 | 3/2017 | | |

OTHER PUBLICATIONS

Extended Search Report for EP18783985.7, dated Dec. 8, 2020 7 pages.
JPO Office Action Dated Aug. 22, 2023 for JP Pat. App. No. 2022-112352.
JPO Office Action Dated May 10, 2024 for JP Pat. App. No. 2022-112352 with English translation from Espacenet.

* cited by examiner

FAST DRY INK COMPOSITION FOR CONTINUOUS INKJET APPLICATIONS

BACKGROUND

In ink jet printing, printing is accomplished without contact between the printing device and the substrate on which the printed characters are deposited. Briefly described, inkjet printing involves projecting a stream of ink droplets to a surface and controlling the direction of the stream, e.g., electronically, so that the droplets are caused to form the desired printed image on that surface. This technique of noncontact printing is well suited for application of characters onto a variety of surfaces including porous and non-porous surfaces.

In general, an inkjet ink composition should meet certain requirements to be useful in inkjet printing operations. These relate to viscosity, resistivity, solubility, compatibility of components, and wettability of the substrate. Further, the ink should be quick-drying and smear-resistant, should be capable of passing through the inkjet nozzle without clogging, and should permit rapid cleanup of the machine components with minimum effort. In addition, the jet ink composition should provide printed images that adhere well to the substrates, particularly non-porous substrates, which, as is known to those of ordinary skill in the art pose challenges with respect to achieving image adhesion.

Most continuous inkjet (CIJ) inks use methanol and/or methyl ethyl ketone (MEK) as the solvent or the main solvent because such inks produce a fast dry time due to their volatility, good adhesion, and because methanol and MEK are good solvents for the binder resins and dyes in the inks. However, both MEK and methanol are on the Japan ISHL Class 2 Organic Solvent List and are not permitted above 5% by weight in Japan. Therefore, attempts have been made to develop inks based on solvents other than MEK and methanol due to their health and safety concerns, regulations such as VOC (volatile organic compounds) and HAP (hazardous air pollutants) and the like. Both MEK and methanol are regulated under VOC regulations in the U.S. Methanol is regulated as HAP. In Europe, methanol is listed as a toxic chemical and requires the skull and cross-bone symbol on the label. In addition, methanol is listed on the European Council of Paint, Printing Ink, and Artists' Colours Industry (CEPE) Exclusion List for printing inks and related products. Thus, it is preferable to develop ink products that avoid using MEK and methanol.

Other than MEK and methanol, alternative proposed solvents for inkjet ink compositions include acetone, methyl acetate, dioxolane, and ethyl acetate. However, acetone and methyl acetate are too volatile for inkjet printing, leading to a need for higher makeup consumption as well as less printer reliability in hot environments. Dioxolane and ethyl acetate are less effective in providing ink conductivity, so more conductive agent is required to be added, which leads to poorer adhesion of the ink composition to substrates. Further, all these solvents still suffer from health, safety, and odor concerns, particularly when printing on certain food packaging materials.

1,2-dimethoxyethane, which also has been used for inkjet compositions, is not on the Japan ISHL Class 2 Organic Solvent List, but actually poses more health hazards than MEK and many other solvents which are regulated to protect worker health and safety. Therefore, this is not a good substitute.

Other ink products, such as VIDEOJET® V460 are based on ethanol, which is relatively safe and not on the Japan ISHL Class 2 Organic Solvent List. Ethanol and n-propanol are more acceptable solvents for inkjet ink compositions because they have low odor and have relatively low toxicity. They are not regulated under HAP and are not included on the CEPE Exclusion List. However, ethanol and n-propanol do not have very good solvency for or compatibility with many of the resins, dyes, and conductive agents commonly used in MEK-based inkjet inks. Therefore, it is more challenging develop an ethanol and/or n-propanol ink that meets ink adhesion and ink stability requirements, due to the limitations of choice in which binder resins, dyes, conductive agents can be used. In this regard, n-propanol is even more challenging to use than ethanol, because n-propanol has even less solvency for binder resins and dyes. In addition, ethanol inks tend to absorb water, especially in humid environments, creating other problems in use and decreasing reliability of printer operation, or necessitating an air drier. Ethanol solvent inks are not as practical in certain geographical areas due to humidity. In addition, some of the suitable resins for ethanol-based ink compositions, such as phenolic resins, are not considered very safe due to the presence of residual phenol and trace amount of formaldehyde in ink compositions using phenolic binders. Polyamide resins have a tendency to precipitate out of solution when the ink absorbs water from the environment, which also leads to unreliable printer operation, especially in humid environments. Use of ethanol, either as the only solvent or even as a smaller component of the solvent mixture, also increases dry time of an ink. In addition, ethanol-containing inks face difficulties and restrictions for importation into certain countries and regions due to strict importation laws regarding alcohol. Therefore, an ink that is free of the more hazardous organic solvents and also free or substantially free of ethanol, yet has similar adhesion and other properties to traditional prior art MEK inks, would be advantageous.

Therefore, there is a need in the art for continuous inkjet ink compositions that meet the necessary requirements for reliable printing and safety to workers manufacturing and using the compositions, and with regard to their use on food packaging and in a food manufacturing environment.

SUMMARY OF THE INVENTION

The ink compositions according to embodiments of the invention are suitable for various ink and printing applications, preferably continuous inkjet printing in industrial applications, and use solvents which are not highly regulated and are safer than traditional solvents used for continuous inkjet printing. These compositions use greater than 60% by weight of volatile $C_5$ ketone solvents and avoid using appreciable or substantial amounts of organic solvents which are on the Japan ISHL Class 2 Organic Solvent List.

Embodiments of the invention relate to ink compositions which comprise (a) greater than 60% by weight of one or more volatile $C_5$ ketone solvents; (b) one or more binder resins; and (c) one or more colorants, wherein the ink composition contains substantially no acetone, methanol, or methyl ethyl ketone. In preferred embodiments, the one or more volatile $C_5$ ketone solvents are selected from the group consisting of 2-pentanone, 3-pentanone, 3-methyl-2-butanone, and mixtures thereof.

Embodiments according to the invention include an ink composition comprising: (a) a solvent comprising one or more volatile $C_5$ ketone solvents which are present at greater than 60% by weight of the ink composition; (b) one or more binder resins; and (c) one or more colorants. Preferred embodiments according to the invention comprise (a), (b), and (c) above, wherein the ink composition contains less than 5% by weight acetone, methanol, methyl ethyl ketone, or any combination thereof. In addition, certain preferred embodiments of these ink compositions further contain ethanol, n-propanol, or a combination thereof in an amount up to 30%, or up to 15%, or up to 5%.

Highly preferred ink compositions contain substantially no acetone, methanol, ethanol, or methyl ethyl ketone.

Preferred ink compositions as described above are those wherein the one or more volatile $C_5$ ketone solvents are selected from the group consisting of 2-pentanone (methyl propyl ketone), 3-pentanone (diethyl ketone), 3-methyl-2-butanone (methyl isopropyl ketone), and mixtures thereof. Ink compositions wherein the one or more volatile $C_5$ ketone solvent is 3-methyl-2-butanone (methyl isopropyl ketone), are most preferred.

In addition the ink compositions can contain greater than 70% by weight of one or more volatile $C_5$ ketone solvents or greater than 80% by weight of one or more volatile $C_5$ ketone solvents.

The invention also includes ink compositions as discussed above, wherein the one or more binder resins are selected from the group consisting of cellulose ester resin, vinyl resin, modified rosin ester resin, polyvinyl butyral resin, polyester resin, and mixtures thereof, more preferably wherein the one or more binder agent is selected from the group consisting of cellulose ester resin, vinyl resin, polyester resin, and mixtures thereof, and most preferably wherein the cellulose ester resin is cellulose acetate propionate resin. Preferred ink compositions are those wherein the one or more binder resins are present in an amount from about 5.0% to about 13.0% by weight of the ink composition.

In certain embodiments according to the invention, the one or more colorants are selected from the group consisting of Solvent Black 29, Solvent Black 27, and mixtures thereof, and preferably the one or more colorant is Solvent Black 29, such as ORASOL BLACK X55™, VALIFAST BLACK® 3808, and DL BLACK N36B™.

Other embodiments according to the invention include ink compositions which further comprise one or more additives selected from the group consisting of a surfactant, a plasticizer, an adhesion promoter, a conductive agent, a defoamer, and mixtures thereof. Surfactants preferably are polyalkyleneoxide modified polysiloxanes. Preferably the one or more surfactants are present in an amount from about 0.1% to about 2.0% by weight of the ink composition.

Additional embodiments according to the invention include a method of continuous inkjet printing on a substrate comprising: directing a stream of droplets of an ink composition as discussed above onto the substrate and allowing the droplets to dry, to print an image on the substrate. The substrate can be porous, semi-porous, or non-porous, such as substrates selected from the group consisting of uncoated paper, coated paper, hard or soft plastics, polymer films, metals and alloys, glass, and ceramics.

DETAILED DESCRIPTION OF THE
PREFERRED EMBODIMENTS

1. Definitions

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise defined, all technical and scientific terms used herein are intended to have the same meaning as commonly understood in the art to which this invention pertains at the time of its filing. Although various methods and materials similar or equivalent to those described herein can be used in the practice or testing of the present invention, suitable methods and materials are described below. However, the skilled should understand that the methods and materials used and described are examples and may not be the only ones suitable for use in the invention.

Moreover, it should also be understood that as measurements are subject to inherent variability, any temperature, weight, volume, time interval, pH, salinity, molarity or molality, range, concentration and any other measurements, quantities or numerical expressions given herein are intended to be approximate and not exact or critical figures unless expressly stated to the contrary. Hence, where appropriate to the invention and as understood by those of skill in the art, it is proper to describe the various aspects of the invention using approximate or relative terms and terms of degree commonly employed in patent applications, such as: about, approximately, substantially, essentially, consisting essentially of, comprising, and effective amount. Unless defined otherwise, all technical and scientific terms used herein have the same meaning as commonly understood by one of ordinary skill in the art.

The terms "inkjet" or "ink jet," as used herein, refer to inkjet printing, a type of printing that creates an image by propelling small droplets of ink onto a substrate such as paper, plastic, metal, glass, and the like. "Continuous inkjet" or "CIJ" methods are used, for example, in the marking and coding of products and packages. In this method, a pump directs a liquid ink composition from a reservoir to a nozzle to create a continuous stream of ink droplets, which are subjected to a controlled and variable electrostatic field, and thereby are charged as the droplets form according to the varying electrostatic field. The charged droplets are deflected to the proper location by passing through another electrostatic field to print the desired pattern on a substrate, or are recycled back to the reservoir for future use.

The phrases "substantially free of" or "substantially no," as used herein, in the context of a solvent or other component in the inventive ink composition, refers to a condition in which preferably no appreciable or readily detectable amount of the indicated component is present in the composition. "Substantially no" or "substantially free of" can refer to an amount which is below the detection limit of commonly used detection methods known in the art, or below the maximum amount permitted for the compound by regulation, or an amount below 5%, and preferably below 2%, below 1%, or below 0.5%. Preferably, the amount is an amount that accepted under Japanese, European, and/or United States regulations for a regulated compound. For example, for the Japan ISHL Class II organic solvents list, the total concentration of all solvents in the list (such as MEK, methanol, acetone, and ethyl acetate) cannot be more than 5% combined in the ink.

With respect to ethanol or n-propanol, however, if ethanol or n-propanol is present in the inventive ink compositions, each should be present as less than 30% of the composition by weight, and more preferably as less than 15% of the composition by weight, so that it does not have a significant impact on application performance such as dry time and adhesion. Most preferably, the ink is free of or substantially free of ethanol to avoid difficulty when importing to geographic areas with strict regulations concerning ethanol.

The term "solvent," as used herein, refers to a component whose primary function is to dissolve and carry the other components of the ink composition.

The term "colorant," as used herein, refers to a dye, pigment or other substance that imparts color or modifies the hue of something else, and can refer to any such substance. Colorants include black dyes as well as other colors.

The term "volatile," as used herein refers to the tendency of a substance to vaporize, related to the vapor pressure of the substance. A volatile solvent is one that has the capability of evaporating or going into a vapor phase.

The term "additive," as used herein, refers to an optional component that may be added to the inventive ink composition.

The term "binder resin," as used herein, refers to a substance that aids in making the ink composition stick to the substrate to which it is applied during printing. In general, a binder is a material that holds other materials together to form a cohesive whole or to impart adhesive properties.

The acronym "MEK," as used herein, refers to methyl ethyl ketone, also known as butanone. MEK is a colorless organic liquid solvent of the formula $CH_3C(O)CH_2CH_3$. The acronym "MPK," as used herein, refers to methyl propyl ketone, also known as 2-pentanone. MPK is an organic liquid solvent of the formula $CH_3CH_2CH_2C(O)CH_3$. The acronym "MIPK," as used herein, refers to methyl isopropyl ketone, also known as 3-methyl-2-butanone. MIPK is an organic liquid solvent of the formula $(CH_3)_2CHC(O)CH_3$. The acronym "DEK," as used herein, refers to diethyl ketone, also known as 3-pentanone. DEK is an organic liquid solvent of the formula $CH_3CH_2C(O)CH_2CH_3$.

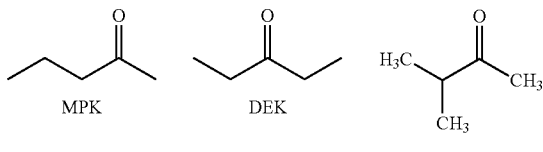

2. Overview

The ink compositions described herein employ one or more volatile $C_5$ ketone (pentanone) solvents such as MPK, MIPK, and DEK, along with one or more binder resins and a colorant. The compositions also optionally contain other additives such as a plasticizer, a surfactant, a conductive agent, additional solvents, an adhesion promoter, and/or a defoamer.

These ink compositions perform well in terms of adhesion and drying time, and are useful for applications including single nozzle continuous inkjet printing, but also could be used in multiple nozzle continuous inkjet or binary array printing. The inventive ink compositions differ from inks used for thermal inkjet (TIJ) printing because they do not contain a humectant. TIJ ink compositions usually contain a humectant and are up to 30% humectant. The inventive ink compositions have superior health and safety profiles than inks that use other organic solvents such as 1,2-dimethoxyethant and methanol or use less than 60% of a volatile $C_5$ ketone solvent, and better drying times and performance than inks that contain ethanol at higher than 30% by weight.

The inventive ink compositions allow use in Japan to use without having to implement expensive exhaust extraction systems that are needed for typical CIJ inks when exceeding certain threshold of regulated solvent(s), and also have application performance and health/safety advantages over other inks that have been developed to comply with the negative list in Japan. Ink compositions (CIJ inks) that meet Japan's "Order for Enforcement Industrial Safety and Health Act" but also have similar application performance to a typical MEK-based CIJ ink are in demand.

3. Results

Ink compositions were produced according to embodiments of the invention. Commercially available ink products were obtained for comparative testing. The inventive products were tested for drying time, after printing using a VIDEOJET® CIJ sample rig. The results clearly show that the drying times of the inventive compositions were comparable to those ink products using MEK as the solvent and superior to ethanol-based inks. See Example 3.

The inks were tested for adhesion by four separate tests (see Example 4) after printing as above. In the thumb rub, PINK PEARL® Eraser, fingernail scratch, and tape tests, the inventive compositions generally were superior to or comparable to the prior art compositions. Therefore, the inventive inks were suitable for use in their intended purposes while being safer for manufacture and use.

4. Embodiments of the Invention

The ink composition of the invention may have any suitable viscosity or surface tension. In embodiments of the invention, the ink composition has a viscosity in the range of 1 cP to 10 cP, preferably in the range of 2 cP to 6 cP at 25° C. The ink composition preferably has a viscosity of less than about 10 cP, preferably less than about 6 cPs at 25° C.

The ink compositions of the invention preferably has a surface tension from about 20 to about 30 mN/m at 25° C.

The ink compositions of the invention preferably have a resistivity at 25° C. of about 500-2000 Ohm-cm or preferably about 900-1500 Ohm-cm.

The inkjet ink compositions according to embodiments of the invention preferably are stable at least over a period of several weeks (e.g., 4-6 weeks) at temperature extremes, such as between −15° C. and 62° C.

The ink compositions according to the invention are sufficiently volatile to produce a fast drying time to avoid smearing to result in a good printed product and allows high-speed printing. The drying time of the jet-printed message preferably is less than 10 seconds, more preferably less than about 2 seconds.

The solvents and solvent mixtures used in the ink compositions according to embodiments of the invention are $C_5$ ketone organic solvents and mixtures thereof. The inventive compositions contain at least 60% of MPK, MIPK, DEK, or a combination thereof, and substantially no solvents listed on the Japan ISHA as class II organic solvents. The solvent or solvent mixture preferably contains no organic solvents that will be disallowed by health and safety regulations in Japan, Europe, and/or the United States.

Organic solvents listed as class II under the Japan ISHA include acetone, isobutyl alcohol, isopropyl alcohol, isopentyl alcohol (isoamylalcohol), diethyl ether, ethylene glycol monoethyl ether (Cellosolve™), ethylene glycol monoethyl ether acetate (Cellosolve™ acetate), ethylene glycol mono-n-butyl ether (Butyl Cellosolve™), ethylene glycol monomethyl ether (Methyl Cellosolve™), o-dichlorobenzene, xylene, cresol, chlorobenzene, isobutyl acetate, isopropyl acetate, isopentyl acetate (isoamyl acetate), ethyl acetate, n-butyl acetate, n-propyl acetate, n-pentyl acetate (n-amyl acetate), methyl acetate, cyclohexanol, cyclohexanone, N,N-dimethylformamide, tetrahydrofuran, 1,1,1-trichloroethane (trichloroethylene), toluene, n-hexane, 1-butanol, 2-butanol, methanol, methyl ethyl ketone, methylcyclohexanol, methylcyclohexanone, methyl n-butyl ketone, styrene (ethenyl benzene, vinyl benzene), and n-hexane. Class I organic solvents under the same system include chloroform, carbon tetrachloride, 1,2-dichloroethane, 1,2-dichloroethylene, 1,1,2,2-tetrachloroethane, trichloroethylene, and carbon disulfide. Class III organic solvents include gasoline, coaltar naphtha, petroleum ether, petroleum naphtha, petroleum benzene, turpentine oil, and mineral spirit.

The preferred ink composition embodiments of the invention include at least one binder resin, however more than one binder resins can be present. The amount of the binder resin in the compositions can be determined by the skilled artisan, and depends on the binder resin or binder resins chosen. The total amount of binder resin can be any suitable amount. For example, the binder resin or combination of binder resins can be present in an amount from about 0.1% to about 30%, preferably from about 2% to about 20%, and more preferably from about 4% to about 15% of the inkjet ink composition. The most preferred compositions contain about 6% to about 14% binder resin(s).

Any suitable binder resin, including soluble or dispersible binder resins, can be employed. Preferred binder resins are soluble in the $C_5$ ketone solvent or solvent mixture in the composition. Thus, preferably any binder resin contemplated for use with the invention is soluble in MEK, MIPK, DEK, or a mixture thereof. In certain embodiments, the ink composition can include one or more binder resins selected from acrylic resins, polyvinyl butyral resins, ethylcellulose resins, polyurethane resins, modified rosin resins, phenolic resins, modified phenolic resins, polyamides, cellulose ethers, cellulose esters (such as cellulose acetate, cellulose acetate butyrate (CAB), and cellulose acetate propionate (CAP)), cellulose nitrate resins, polymaleic anhydrides, polyester resins, vinyl chloride/vinyl acetate copolymer (vinyl resin), styrene/methacrylate copolymers, aldehyde resins, polyvinyl alcohol, copolymers of styrene and allyl alcohol, and polyketone resins, and any combination thereof. The term "acrylic resin" includes both polymers of the acrylics and/or alkyl acrylics and copolymers of the acrylics and/or alkyl acrylics with other monomers such as styrene and/or alpha-methylstyrene.

Certain embodiments preferably include one or more binder resins selected from cellulose ester resins, vinyl resins, modified rosin ester resins, polyvinyl butyral resins, polyester resins, and any combination thereof. In one embodiment, the ink composition includes a vinyl resin as the primary binder and either a hydrogenated rosin resin, CAP resins, or a mixture thereof as a secondary binder.

Examples of acrylic resins include styrene-acrylic resins which can be made by copolymerizing styrene with acrylic monomers such as acrylic acid, or methacrylic acid, and optionally with alkyl acrylate monomers such as methyl acrylate, methyl methacrylate, butyl acrylate, butyl methacrylate, hydroxyethyl acrylate, hydroxyethyl methacrylate, and the like. Styrene acrylics are commercially available under the tradename JONCRYL®. Examples of JONCRYL® resins include JONCRYL® 555, 586, 678, 680, 682, 683, and 67. JONCRYL® 682, a preferred resin, has a weight average molecular weight of about 1700, an acid number of about 238, a softening temperature of about 105° C., and a glass transition temperature of about 56° C. Examples of commercially available vinyl resins are VINNOL®, available from WACKER CHEMIE® AG, and vinyl chloride resin (YMCA resin), available from Suzhou Direction Chemical Co. Ltd. Examples of commercially available polyvinyl butyral resins are PIOLOFORM® BN18, available from WACKER CHEMIE® AG, and MOWITAL® LP B16H available from KURARAY® America, Inc. Examples of commercially available CAP resins are cellulose acetate propionate available from EASTMAN® Chemical. Examples of commercially available modified rosin esters are SUPER ESTER™ A-75, available from ARAKAWA® Chemical, and STAYBELITE® Ester 10, available from PINOVA®.

In preferred embodiments, the ink composition does not include a phenolic resin as a binder, because preferably the ink compositions are free or substantially free of aldehydes, such as formaldehyde, which are undesirable residues frequently found in aldehyde derived phenolic resins such as novolak and resoles resins. Formaldehyde is toxic and a suspected carcinogen. It is believed that the aldehyde residues which are often found in the resin also adversely affect the color characteristics of certain dyes, e.g., azo dyes. The ink composition preferably includes less than 1% or less than 0.5% of any aldehyde-derived phenolic resin, by weight of the ink composition. The ink composition is preferably substantially free of aldehyde-derived phenolic resins.

In other preferred embodiments, the ink composition does not include a polyamide resin as a binder. Polyamide resins have tendency to precipitate out when the ink composition absorbs water from the environment. The ink composition preferably includes less than 1% or less than 0.5% of any polyamide resin, by weight of the ink composition. The ink composition is preferably substantially free of polyamide resins.

In other preferred embodiments, the ink composition does not include a hydroxyaromatic resin as a binder. The ink composition preferably includes less than 1% or less than 0.5% of any hydroxyaromatic resin, by weight of the ink composition. The ink composition is preferably substantially free of hydroxyaromatic resins.

The most preferred binder resins are cellulose acetate propionate (CAP), STAYBELITE® Ester 10, Polyvinyl butyral (PVB) resin, Dertophene™, VINNOL® E15/45M, TEGO® AddBond LTH, and combinations thereof. The most preferred embodiments contain CAP, Staybellite ester 10 and VINNOL® E15/45M, or contain CAP, Dertophene™, and Vinnol E15/45M, or contain PVB and TEGO® AddBond LTH.

In any of the inventive embodiments, the ink composition contains at least one colorant. The colorant can be present in an amount from about 0.1% to about 12%, preferably from about 1% to about 10%, and more preferably from about 2% to about 8% by weight of the inkjet ink composition.

The colorant can be any colorant or combination of colorants suitable for the printing use. The colorant preferably is a dye. In an embodiment of the invention, one or more dyes are employed as the colorant, which dyes are selected from the group consisting of acid dyes, basic dyes, solvent dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes.

For example, the ink composition according to certain embodiments of the invention can include one or more dyes selected from the group consisting of C.I. Solvent Black 3, C.I. Solvent Black 5, C.I. Solvent Black 7, C.I. Solvent Black 22, Solvent Black 26, C.I. Solvent Black 27 (such as VALIFAST BLACK® 3840L), C.I. Solvent Black 29 (such as VALIFAST BLACK® 3808, ORASOL BLACK X55™, and DL BLACK N36B™), C.I. Solvent Black 48, any combination thereof. Preferred solvent dyes are Solvent Black 27 (VALIFAST BLACK® 3840L), Solvent Black 29 (ORASOL BLACK X55™), Solvent Black 29 (VALIFAST BLACK® 3808) and Solvent Black 29 (DL BLACK N36B™).

The ink composition of the invention may further include one or more additives such as plasticizers, surfactants, defoamers, adhesion promoters, and mixtures thereof. The additive preferably is miscible with the ink composition and does not phase separate from the composition during application of the ink to a substrate during printing.

Examples of plasticizers that are suitable for use in embodiments of the invention include PLASTICIZER #8®, available from RIT-CHEM® Co., Inc. The plasticizer additive can be present in an amount from about 0.1% to about 5%, or preferably from about 0.3% to about 3%, by weight of the inkjet ink composition.

Examples of surfactants which can be used include fluorosurfactants, siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols, or any combination thereof. A preferred specific example of a suitable polymeric surfactant, is SILWET® L7622, available from GENERAL ELECTRIC®, which is a silicone surfactant. The surfactant additive can be present in an amount from about 0.01 to about 1.0%, or preferably from about 0.02 to about 0.5%, by weight of the inkjet ink composition.

The ink composition also can include an adhesion promoter. A suitable adhesion promoter is a silane, such as SILQUEST® WETLINK 78, which is glycidoxypropyl diethoxymethylsilane, SILQUEST® A-186 SILANE, which is beta-(3,4-epoxycyclohexyl)ethyltrimethoxy silane, and SILQUEST® A-187 SILANE, which is gamma-glycidoxypropyltrimethoxy silane, all available from GENERAL ELECTRIC®. The adhesion promoter can be present in an amount from about 0.1 to about 2%, preferably from about 0.2 to about 1.0%, and more preferably about 0.5% by weight of the ink composition.

The ink composition preferably includes little or no water. Water is preferably present in an amount less than 5%, more preferably less than 4%, even more preferably less than 2%, and most preferably less than 1% by weight of the inkjet ink composition. The ink composition can contain some other organic solvents such as ethanol and 1-propanol, which are not listed in the Japan ISHA class II organic solvent list. In particular, if the composition contains one or more organic solvents listed in the Japan ISHA class II organic solvent list, it/they is/are present in an amount less than 5% or less than 1%, preferably less than 0.5%, more preferably less than 0.1%, even more preferably less than 0.01%, and most preferably less than 0.001%, by weight of the ink composition. For solvents other than the volatile $C_5$ ketone solvents (MPK, MIPK, DEK) which are not listed in the Japan ISHA class II organic solvent list, it/they is/are present in an amount less than 30%, preferably less than 15%, more preferably less than 5%, and most preferably are free or substantially free of ethanol. Preferred ink compositions can contain amounts of other organic solvents less than that acceptable under Japanese, European, or United States health and safety regulations. Most preferably, the ink composition contains no detectable organic solvents such as methanol, MEK, or other solvents on the Japan ISHA class II list, or ethanol.

In addition, solvents that are listed by the United States Drug Enforcement Agency as potential drug precursors are not preferred. For example, the ink compositions are substantially free of MEK and acetone for this reason as well.

The ink composition of the invention can be prepared by any suitable method. For example, the chosen ingredients may be combined and mixed with adequate stirring and the resulting fluid filtered to remove any undissolved impurities.

The present invention further provides a method for printing images on a substrate in a continuous inkjet printer comprising directing a stream of droplets of any of the embodiments of the ink composition of the invention described herein to a substrate and allowing the ink droplets to dry, thereby printing images on a substrate. Any continuous inkjet printing methods and equipment as known in the art are contemplated for use with the invention. Any suitable substrate may be printed in accordance with the invention. Examples of suitable substrates include porous substrates such as uncoated paper and cardboard and the like; semi-porous substrates such as aqueous coated paper, clay coated paper, silica coated paper, UV overcoated paper, polymer overcoated paper, and varnish overcoated paper and the like; and non-porous substrates such as plastics (e.g., high density polyethylene, low density polyethylene), polymer films, and the like, metals and alloys (e.g., steel, aluminum, brass, and the like); glass, and ceramics. The paper substrates may be thin sheets of paper, rolls of paper, or cardboard. Plastics, metals, glass, and ceramic substrates may be in any suitable form such as in the form of bottles or containers, plates, rods, cylinders, etc. The paper substrates may be articles made of paper or cardboard, including thin sheets of paper, rolls of paper, or cardboard sheets. In certain embodiments, the printing operation can be performed in industries such as the dairy industry, where penetration of wet surfaces during printing may be required.

Because of the natural variation in viscosity in ink compositions made according to the same or similar formulas, during manufacture of the ink the product is intentionally made slightly more concentrated or with slightly higher viscosity (more solids) than needed. It then can be diluted as necessary with more or less additional solvent to meet a particular viscosity range requirement.

5. Examples

It is to be understood that this invention is not limited to the particular exemplified processes, compositions, or methodologies described, as these may vary. It is also to be understood that the terminology used in the description is for the purpose of describing the particular versions or embodiments only, and is not intended to limit the scope of the present invention which will be limited only by the appended claims. Unless defined, otherwise, all technical and scientific terms used herein have the same meanings as commonly understood by one of ordinary skill in the art. Although any methods and materials similar or equivalent to those described herein can be used in the practice or testing of embodiments of the present invention, certain specific and preferred embodiments are now described. All publications mentioned herein, are incorporated by reference in their entirety. Nothing herein is to be construed as an admission that the invention is not entitled to antedate such disclosure by virtue of prior invention.

Example 1. Compositions for Continuous Inkjet Printing

Ink compositions 1, 2, 3, 4, 5, 6, and 7 below were produced with the components indicated below.

| Component | Function | 1 | 2 | 3 | 4 | 5 | 6 | 7 |
|---|---|---|---|---|---|---|---|---|
| MPK (%) | solvent | 77.2 | | 84.2 | 88.6 | 86.8 | | |
| MIPK (%) | solvent | | 86.8 | | | | 81.3 | 78.6 |
| CAP (%) | binder resin | 0.9 | 1.2 | 1.1 | 2.3 | 1.2 | 1.8 | |
| Staybelite ™ ester 10 (%) | binder resin | 9.6 | | 3.0 | | | | |
| Polyvinyl butyral (PVB) resin S-LEC BL (%) | binder resin | | | | | | | 2.8 |
| Dertophene ™ (%) | binder resin | | 2.0 | | | 2.0 | | |
| VINNOL ® E15/45M (%) | binder resin | 2.9 | 3.8 | 3.7 | 2.0 | 3.8 | | |
| TEGO ® AddBond LTH (%) | binder resin | | | | | | 10.0 | 11.0 |
| SILWET ® L7622 (%) | surfactant | 0.5 | 0.1 | 0.5 | 0.2 | 0.1 | 0.1 | 0.1 |
| BYK ®-065 (%) | surfactant | 0.9 | 0.5 | 0.9 | 0.9 | 0.5 | 0.5 | 0.5 |
| PLASTICIZER #8 ® (%) | plasticizer | 0.5 | | | | | | |
| VALIFAST ® 3808 (%) | colorant | 7.5 | 5.6 | 6.6 | 6.0 | 5.6 | 6.3 | 7.0 |
| Total (%) | | 100 | 100 | 100 | 100 | 100 | 100 | 100 |
| Viscosity (cP) at 25° C. | | 3.90 | 3.56 | 3.64 | 3.46 | 3.48 | 3.54 | 3.41 |
| Resisitivity (Ohm-cm) at 25° C. | | 1425 | 969 | 1147 | 1286 | 1146 | 1255 | 1235 |

Example 2. Preferred Continuous Inkjet Ink Compositions

The following examples of ink compositions (1, 2, 3, and 7) are preferred. Composition 2 had a superior drying time. See Example 3. Compositions 1, 3, and 7 had preferred adhesion characteristics. See Example 4.

| Component | 1 |
|---|---|
| MPK | 77.20% |
| CAP | 0.90% |
| STAYBELITE ® ester 10 | 9.60% |
| VINNOL ® E15/45M | 2.90% |
| SILWET ® L7622 | 0.50% |
| BYK ®-065 | 0.90% |
| PLASTICIZER #8 ® | 0.50% |
| VALIFAST ® 3808 | 7.50% |
| Total | 100.00% |

| Component | 2 |
|---|---|
| MIPK | 86.80% |
| CAP | 1.20% |
| Dertophene ™ | 2.00% |
| VINNOL ® E15/45M | 3.80% |
| SILWET ® L7622 | 0.10% |
| BYK ®-065 | 0.50% |
| VALIFAST ® 3808 | 5.60% |
| Total | 100.00% |

| Component | 3 |
|---|---|
| MPK | 84.2% |
| CAP | 1.1% |
| STAYBELITE ® ester 10 | 3.0% |
| VINNOL ® E15/45M | 3.7% |
| SILWET ® L7622 | 0.50% |
| BYK ®-065 | 0.90% |
| VALIFAST ® 3808 | 6.6% |
| Total | 100.00% |

| Component | 7 |
|---|---|
| MIPK | 78.6% |
| PVB resin S LEC BL | 2.8% |
| TEGO ® AddBond LTH | 11.0% |
| SILWET ® L7622 | 0.10% |
| BYK ®-065 | 0.50% |
| VALIFAST ® 3808 | 7.0% |
| Total | 100.00% |

Example 3. Ink Drying Time

The ink compositions indicated below in Table 1 were tested as follows for drying time on the indicated substrates. The ink was printed with alphanumeric codes of a 5×7 matrix on a substrate using a VIDEOJET®CIJ sample rig (XL sample maker) Immediately after printing, the codes were tested using light finger rubs until dry (not smearing). A stopwatch was used to determine the dry time. An average of three drying times was recorded as the dry time of the ink on a particular substrate, rounded up to the nearest 0.5 second increment.

Comparative example 1 (C1) in the tables below is a VIDEOJET® commercial ink product using methyl ethyl ketone (MEK) as the solvent. Comparative example 2 (C2) in the tables below is a non-MEK continuous inkjet ink product available commercially that contains no organic solvents listed on the Japan ISHL Class 2 Organic Solvent List and uses 1,2-dimethoxyethane as the solvent. Comparative example 3 (C3) in the tables below is an ethanol-based product manufactured by VIDEOJET®. The remaining numbers refer to the ink compositions in Example 1. HDPE=high density polyethylene; LDPE=low density polyethylene; PET=polyethylene terephthalate; PP=poly- propylene; PVC=polyvinyl chloride.

TABLE 1

Comparative Ink Drying Times.

| Substrate tested | Dry Time (seconds) | | | | | | | | | |
|---|---|---|---|---|---|---|---|---|---|---|
| | C1 | C2 | C3 | 1 | 2 | 3 | 4 | 5 | 6 | 7 |
| HDPE | ≤1 | 1.5 | 2.5 | 1.5 | 1.2 | 1.5 | 1.5 | 1.5 | 1.5 | 1.5 |
| LDPE | ≤1 | 1.5 | 2.5 | 1.5 | 1.2 | 1.5 | 1.5 | 1.5 | 1.5 | 1.5 |
| PET | ≤1 | 1.5 | 2.5 | 1.5 | 1.2 | 1.5 | 1.5 | 1.5 | 1.5 | 1.5 |
| PP | ≤1 | 1.5 | 2.5 | 1.5 | 1.2 | 1.5 | 1.5 | 1.5 | 1.5 | 1.5 |
| PVC | ≤1 | 2 | 3 | 2 | 1.2 | 2 | 2 | 2 | 1.5-2 | 1.5-2 |
| Aluminum | ≤1 | 1.5 | 2.5 | 1.5 | 1.2 | 1.5 | 1.5 | 1.5 | 1.5 | 1.5 |
| Steel | ≤1 | 1.5 | 2.5 | 1.5 | 1.2 | 1.5 | 1.5 | 1.5 | 1.5 | 1.5 |
| Glass | ≤1 | 2 | 3 | 2 | 1.2 | 2 | 2 | 2 | 1.5-2 | 1.5-2 |
| Average | ≤1 | 1.5-2 | 2.5-3 | 1.5-2 | 1.2 | 1.5-2 | 1.5-2 | 1.5-2 | 1.5-2 | 1.5-2 |

Example 4. Adhesion Testing

The ink compositions were tested for adhesion to the printed surface using 4 separate tests, as indicated in Table 2, Table 3, Table 4, and Table 5 below. The methods were as follows.

For the Thumb Rub Adhesion Test, alphanumeric codes of a 5×7 matrix were printed on a substrate using a Videojet CU sample rig (XL 101 sample maker). The printed image was allowed to set for 1 minute before performing the test, at which time the printed code was rubbed with a clean thumb unidirectionally across the code with medium pressure trying to cover the exact same area of the code for every rub (maximum 10 times). The number of rubs required to alter or remove the image was recorded and then a number from a scale of 1 to 6 based was assigned. See the grading scale listed under Table 2.

For the PINK PEARL® Eraser Test, Finger Nail Scratch Test, and Tape Test, the printed image was allowed to set for 24 hours before performing the test. For the PINK PEARL® Eraser Test, the printed substrate was placed on a firm surface with the printed code facing up, and the PINK PEARL® eraser was rubbed across the printed characters from left to right, with a force of about 3 kg. A balance was used to calibrate the force as needed. The number of erasures required to alter or remove the image was recorded and then a number from a scale of 1 to 6 based on the number of erasures was assigned using the grading scale listed under Table 3.

For the Fingernail Scratch Test, the printed substrate was placed on a firm surface with the printed code facing up, and scratched from left to right along the code trying to cover the exact same area of the code for every scratch using the thumb fingernail with moderate pressure. The number of scratches required to alter or remove the image was recorded and then a number from a scale of 1 to 6 based on the number of scratches was assigned using the grading scale listed under Table 4.

For the Tape Test, the printed substrate was placed on a firm surface with the printed code facing up, and a tape (3M SCOTCH® Transparent Tape #600 or equivalent) was applied over the entire printed code using one firm (3 kg) rub to flatten the tape surface to ensure full contact with the printed surface. The tape then was removed by seizing the free end and pulling it off rapidly (not jerked) back upon itself at as close to an angle of 180° as possible. The code and the tape were evaluated and compared to an untested code. A number from a scale of 1 to 6 was assigned based on the legibility of the code and the amount of ink transferred to the tape using the grading scale listed under Table 5.

Printing for all tests was performed using a VIDEOJET® CIJ sample rig (XL 101 sample maker). The thumb rub adhesion test was performed 1 minute after printing; the remaining tests were performed 24 hours after printing.

TABLE 2

Thumb Rub Adhesion test.

| Substrate tested | Adhesion Results | | | | | | | | | |
|---|---|---|---|---|---|---|---|---|---|---|
| | C1 | C2 | C3 | 1 | 2 | 3 | 4 | 5 | 6 | 7 |
| HDPE | 6.0 | 6.0 | 6.0 | 6.0 | 6.0 | 6.0 | 6.0 | 6.0 | 6.0 | 6.0 |
| LDPE | 6.0 | 6.0 | 6.0 | 6.0 | 6.0 | 6.0 | 6.0 | 6.0 | 6.0 | 6.0 |
| PET | 6.0 | 6.0 | 6.0 | 6.0 | 6.0 | 6.0 | 6.0 | 6.0 | 6.0 | 6.0 |
| PP | 6.0 | 6.0 | 6.0 | 6.0 | 6.0 | 6.0 | 6.0 | 6.0 | 6.0 | 6.0 |
| PVC | 6.0 | 6.0 | 6.0 | 6.0 | 6.0 | 6.0 | 6.0 | 6.0 | 6.0 | 6.0 |
| Aluminum | 6.0 | 6.0 | 6.0 | 6.0 | 6.0 | 6.0 | 6.0 | 6.0 | 6.0 | 6.0 |
| Steel | 6.0 | 6.0 | 6.0 | 6.0 | 6.0 | 6.0 | 6.0 | 6.0 | 6.0 | 6.0 |
| Glass | 6.0 | 5.9 | 6.0 | 5.5 | 6.0 | 5.0 | 5.5 | 6.0 | 6.0 | 6.0 |
| Average | 6.0 | 6.0 | 6.0 | 5.9 | 6.0 | 5.9 | 5.9 | 6.0 | 6.0 | 6.0 |

Grading Scale: 6 = no change to printed code after 10x (x = number of rubs); 5 = fading of printed code (<50%) after 10x, with all characters legible; 4 = fading of the printed code (>50%) after 10x, with all characters legible; 3 = some or all characters illegible after 10x, but legible after 5x; 2 = some or all characters illegible after 5x, but legible after 1x; 1 = some or all characters illegible after 1x.

TABLE 3

PINK PEARL ® Eraser Test.

| Substrate tested | Adhesion Results | | | | | | | | | |
|---|---|---|---|---|---|---|---|---|---|---|
| | C1 | C2 | C3 | 1 | 2 | 3 | 4 | 5 | 6 | 7 |
| HDPE | 5.0 | 4.3 | 2.5 | 5.5 | 5.5 | 5.0 | 3.0 | 5.5 | 4.0 | 5.0 |
| LDPE | 6.0 | 5.5 | 3.0 | 5.5 | 6.0 | 6.0 | 5.0 | 6.0 | 6.0 | 6.0 |
| PET | 5.0 | 5.0 | 3.0 | 5.8 | 6.0 | 6.0 | 6.0 | 6.0 | 5.0 | 6.0 |
| PP | 4.5 | 2.8 | 1.5 | 5.0 | 3.0 | 3.0 | 1.0 | 3.0 | 2.0 | 2.0 |
| PVC | 5.5 | 6.0 | 5.0 | 6.0 | 5.0 | 6.0 | 6.0 | 6.0 | 6.0 | 6.0 |
| Aluminum | 6.0 | 5.2 | 4.5 | 5.8 | 5.5 | 5.0 | 5.0 | 5.5 | 6.0 | 6.0 |
| Steel | 5.5 | 5.2 | 4.5 | 5.8 | 5.0 | 5.0 | 5.0 | 5.0 | 6.0 | 6.0 |
| Glass | 5.0 | 4.3 | 3.5 | 5.3 | 5.5 | 5.0 | 5.0 | 5.5 | 5.0 | 6.0 |
| Average | 5.3 | 4.8 | 3.4 | 5.6 | 5.2 | 5.1 | 4.5 | 5.3 | 5.0 | 5.4 |

Grading Scale: 6 = no change to printed code after 10x (x = number of rubs); 5 = fading of printed code (<50%) after 10x, with all characters legible; 4 = fading of the printed code (>50%) after 10x, with all characters legible; 3 = some or all characters illegible after 10x, but legible after 5x; 2 = some or all characters illegible after 5x, but legible after 1x; 1 = some or all characters illegible after 1x.

TABLE 4

Fingernail Scratch Test

| Substrate tested | Adhesion Results | | | | | | | | | |
|---|---|---|---|---|---|---|---|---|---|---|
| | C1 | C2 | C3 | 1 | 2 | 3 | 4 | 5 | 6 | 7 |
| HDPE | 2.5 | 2.0 | 1.0 | 2.3 | 1.5 | 2.0 | 3.0 | 1.5 | 2.0 | 3.0 |
| LDPE | 4.0 | 2.6 | 2.0 | 4.8 | 3.0 | 5.0 | 4.0 | 3.0 | 4.0 | 5.0 |
| PET | 6.0 | 5.8 | 4.0 | 6.0 | 6.0 | 6.0 | 6.0 | 6.0 | 6.0 | 6.0 |
| PP | 4.0 | 2.8 | 4.0 | 3.8 | 3.5 | 5.0 | 4.0 | 3.5 | 2.0 | 2.0 |
| PVC | 5.0 | 5.6 | 5.0 | 6.0 | 6.0 | 6.0 | 6.0 | 6.0 | 6.0 | 6.0 |
| Aluminum | 5.0 | 5.8 | 5.5 | 6.0 | 5.5 | 6.0 | 6.0 | 5.5 | 4.0 | 6.0 |
| Steel | 5.0 | 5.8 | 5.0 | 6.0 | 6.0 | 6.0 | 6.0 | 6.0 | 6.0 | 6.0 |
| Glass | 5.0 | 3.8 | 3.0 | 4.8 | 5.5 | 3.0 | 4.0 | 5.5 | 6.0 | 6.0 |
| Average | 4.6 | 4.3 | 3.7 | 4.9 | 4.6 | 4.9 | 4.9 | 4.6 | 4.5 | 5.0 |

Grading Scale: 6 = no change to printed code after 10x (x = number of rubs); 5 = fading of printed code (<50%) after 10x, with all characters legible; 4 = fading of the printed code (>50%) after 10x, with all characters legible; 3 = some or all characters illegible after 10x, but legible after 5x; 2 = some or all characters illegible after 5x, but legible after 1x; 1 = some or all characters illegible after 1x.

TABLE 5

Tape Test.

| Substrate tested | Adhesion Results | | | | | | | | | |
|---|---|---|---|---|---|---|---|---|---|---|
| | C1 | C2 | C3 | 1 | 2 | 3 | 4 | 5 | 6 | 7 |
| HDPE | 6.0 | 3.3 | 4.0 | 6.0 | 4.0 | 4.0 | 4.0 | 4.0 | 3.0 | 5.0 |
| LDPE | 5.0 | 3.0 | 1.0 | 5.3 | 3.0 | 6.0 | 3.0 | 2.5 | 3.0 | 4.0 |
| PET | 6.0 | 5.8 | 3.5 | 6.0 | 6.0 | 6.0 | 6.0 | 6.0 | 5.0 | 6.0 |
| PP | 1.0 | 1.0 | 1.0 | 1.5 | 1.0 | 1.0 | 1.0 | 1.0 | 1.0 | 1.0 |
| PVC | 6.0 | 6.0 | 4.5 | 6.0 | 6.0 | 6.0 | 6.0 | 6.0 | 6.0 | 6.0 |
| Aluminum | 6.0 | 6.0 | 5.5 | 6.0 | 6.0 | 6.0 | 6.0 | 6.0 | 6.0 | 6.0 |
| Steel | 6.0 | 6.0 | 4.0 | 6.0 | 6.0 | 6.0 | 6.0 | 6.0 | 6.0 | 6.0 |
| Glass | 6.0 | 6.0 | 4.0 | 5.8 | 6.0 | 6.0 | 6.0 | 6.0 | 6.0 | 6.0 |
| Average | 5.3 | 4.6 | 3.4 | 5.3 | 4.8 | 5.1 | 4.8 | 4.7 | 4.5 | 5.0 |

Grading scale: 6 = no transfer to the tape and no visible change to printed code; 5 = negligible transfer to the tape only distinguishable when compared to untested printed code; 4 = minimal transfer to the tape (11-25%) but all characters of printed code legible; 3 = significant transfer to the tape (26-50%) but all characters of printed code legible; 2 = significant transfer to the tape (50-99%); 1 = complete transfer to the tape.

Example 5. Preferred Ink Formulation

The following ink is a preferred composition. Drying time and adhesion testing was performed as described above on the indicated substrates, and were graded as described above for each test. The results are contained in Table 6, below.

| Component | Weight Percent |
|---|---|
| Methyl Isopropyl Ketone | 79.60% |
| CAP 482-0.5 | 1.00% |
| STAYBELITE ® Ester 10 | 6.00% |
| PVB S LEC BL 10 | 3.50% |
| SILWET ® L7622 | 0.50% |
| BYK ®-065 | 0.90% |
| DL BLACK N36B ™ | 8.50% |
| TOTAL | 100.00% |

TABLE 6

Test Results.

| | dry time (seconds) | Thumb rub | Pink Pearl Eraser | Fingernail Scratch | Tape |
|---|---|---|---|---|---|
| HDPE | 1.5 | 6.0 | 4.3 | 2.0 | 6.0 |
| LDPE | 1.5 | 6.0 | 6.0 | 3.0 | 5.0 |
| PET | 1.5 | 6.0 | 5.0 | 6.0 | 6.0 |
| PP | 1.5 | 6.0 | 4.5 | 4.0 | 1.0 |
| PVC | 1.5-2 | 6.0 | 6.0 | 6.0 | 6.0 |
| Aluminum | 1.5 | 6.0 | 5.5 | 5.8 | 6.0 |
| Steel | 1.5 | 6.0 | 5.5 | 5.8 | 6.0 |
| Glass | 1.5 | 6.0 | 4.3 | 5.0 | 5.0 |
| Average | 1.5-2 | 6.0 | 5.1 | 4.7 | 5.1 |

REFERENCES

References listed below and throughout the specification are hereby incorporated by reference in their entirety.
1. U.S. Pat. No. 8,142,559.
2. U.S. Pat. No. 8,414,695.
3. U.S. Pat. No. 8,632,630.
4. U.S. Pat. No. 9,249,326.

What is claimed is:

1. A continuous inkjet ink composition comprising:
   (a) a solvent comprising methyl propyl ketone, methyl isopropyl ketone, diethyl ketone or a combination of any thereof, which are present at greater than about 60% by weight of the ink composition, and comprising ethanol at up to 30% by weight of the ink composition;
   (b) one or more-binder resins;
   (c) a modified rosin ester resin, a terpene phenolic resin, or both;
   (d) a surfactant; and
   (e) one or more colorants,
wherein the ratio of the modified rosin ester resin, terpene phenolic resin or both of (b) to the total binder resin, inclusive of the modified rosin ester resin, terpene phenolic resin, or both is between about 1:1 to about 1:4.

2. The ink composition of claim 1, wherein the solvent comprises methyl propyl ketone, methyl isopropyl ketone, or both.

3. The ink composition of claim 1, wherein the solvent contains methyl propyl ketone.

4. The ink composition of claim 1, wherein the binder resin is present in an amount from about 2% to about 20% by weight of the ink composition.

5. The ink composition of claim 1, wherein the one or more colorants are selected from the group consisting of Solvent Black 29, Solvent Black 27, and mixtures thereof.

6. The ink composition of claim 1, which further comprises one or more additives selected from the group consisting of one or more plasticizers, one or more adhesion promoters, one or more conductive agents, one or more defoamers, and mixtures thereof.

7. The ink composition of claim 1 which further comprises a cellulose acetate propionate resin and wherein the solvent comprises methyl propyl ketone and ethanol.

8. A method of continuous inkjet printing on a substrate comprising: directing a stream of droplets of an ink composition of claim 1 onto the substrate and allowing the droplets to dry, to print an image on the substrate.

9. The method of claim 8, wherein the substrate is selected from the group consisting of uncoated paper, coated paper, hard or soft plastics, polymer films, metals and alloys, glass, and ceramics.

10. The ink composition of claim 1, further comprising propanol.

11. The ink composition of claim 1, further comprising an additional solvent which is present at less than 5% by weight of the ink composition.

12. The ink composition of claim 1 wherein the surfactant is present in an amount of from about 0.1% to about 2.0% by weight of the ink composition.

13. The ink composition of claim 1 wherein the surfactant is a polyalkyleneoxide modified polysiloxane.

14. The ink composition of claim 1 which has a viscosity of less than 6 cP at 25° C.

15. The ink composition of claim 1 which has a drying time of less than about 2 seconds.

16. The ink composition of claim 1 wherein the binder resin is selected from the group consisting of cellulose ester resin, vinyl resin, polyvinyl butyral resin, and any mixture thereof.

17. The ink composition of claim 1, wherein the ratio of the modified rosin ester resin, terpene phenolic resin or both of (b) to the total binder resin, inclusive of the modified rosin ester resin, terpene phenolic resin or both, is between about 1:1.3 to about 1:3.7.

\* \* \* \* \*